(12) United States Patent
Yen

(10) Patent No.: US 10,603,807 B2
(45) Date of Patent: Mar. 31, 2020

(54) PUNCHING DEVICE

(71) Applicant: Chin-Wen Yen, Tainan (TW)

(72) Inventor: Chin-Wen Yen, Tainan (TW)

( * ) Notice: Subject to any disclaimer, the term of this patent is extended or adjusted under 35 U.S.C. 154(b) by 121 days.

(21) Appl. No.: 15/685,894

(22) Filed: Aug. 24, 2017

(65) Prior Publication Data

US 2018/0200905 A1 Jul. 19, 2018

(30) Foreign Application Priority Data

Jan. 13, 2017 (TW) .............................. 106200623 U

(51) Int. Cl.
| | |
|---|---|
| *B26D 5/08* | (2006.01) |
| *B26F 1/02* | (2006.01) |
| *B23D 33/02* | (2006.01) |
| *B26F 1/38* | (2006.01) |
| *B26D 7/18* | (2006.01) |

(52) U.S. Cl.
CPC ............. *B26D 5/08* (2013.01); *B23D 33/02* (2013.01); *B26F 1/02* (2013.01); *B26F 1/38* (2013.01); *B26D 7/18* (2013.01)

(58) Field of Classification Search
CPC . B26D 5/08; B26D 7/18; B26D 33/02; B26D 7/015; B26D 3/10; B26D 2007/0087; B26D 2007/0056; B26F 1/02; B26F 1/38; B26F 2001/407; B26F 1/36; B26F 1/14; Y10T 83/9423; Y10T 83/0524; Y10T 83/0577

USPC ... 83/684, 39, 620, 687, 618, 467.1–468.94, 83/821, 823, 829; 30/364, 363, 366; 234/119

See application file for complete search history.

(56) References Cited

U.S. PATENT DOCUMENTS

| | | | | |
|---|---|---|---|---|
| 6,152,005 | A * | 11/2000 | Ootsuka | B21D 45/006 83/138 |
| 6,752,058 | B2 * | 6/2004 | Oh | B26D 3/10 30/358 |
| 2007/0180969 | A1 * | 8/2007 | Kanasashi | B26F 1/14 83/684 |
| 2008/0121083 | A1 * | 5/2008 | Kim | B26D 3/10 83/821 |
| 2015/0033796 | A1 * | 2/2015 | Collins | C03C 17/006 65/55 |

* cited by examiner

*Primary Examiner* — Ghassem Alie
(74) *Attorney, Agent, or Firm* — Hamre, Schumann, Mueller & Larson, P.C.

(57) ABSTRACT

A punching device includes a bottom seat module and an action module. The bottom seat module includes a base plate having a first lower positioning structure, and a restraint member having a plate portion that has a bottom surface facing toward the base plate. The plate portion and the base plate are made of different materials. The action module is movable between a standby position and a punching position, and includes a punching head having a first upper positioning structure. When the action module is at the standby position, one of the first upper positioning structure and the first lower positioning structure slidably engages the other one of the first upper positioning structure and the first lower positioning structure.

12 Claims, 16 Drawing Sheets

PUNCHING DEVICE

CROSS-REFERENCE TO RELATED APPLICATION

This application claims priority of Taiwanese Patent Application No. 106200623, filed on Jan. 13, 2017.

FIELD

The disclosure relates to a pressing device, and more particularly to a punching device that can cut holes or patterns in a sheet material.

BACKGROUND

Referring to FIGS. 1 and 2, a first conventional punching device is adapted to cut a sheet material 40, and includes a punching head 51, a guiding seat 52, and a bottom seat 53 disposed below and connected to the guiding seat 52. The punching head 51 is movable relative to the bottom seat 53 between a standby position and a punching position. When the punching head 51 is at the standby position, the punching head 51 extends through the guiding seat 52, and is spaced apart from the bottom seat 53 such that, the sheet material 40 can be inserted into a space between the guiding seat 52 and the bottom seat 53. When the punching head 51 moves from the standby position to the punching position, the punching head 51 is inserted into a corresponding through hole of the bottom seat 53, and cooperates with the bottom seat 53 to cut the sheet material 40 disposed there between. The guiding seat 52 and the bottom seat 53 of the first conventional punching device must be formed as one piece, or be made of the same materials, so that the dimension of the guiding seat 52 can be precisely controlled, and the punching head 51 can be precisely guided by the guiding seat 52 to be inserted into the corresponding through hole of the bottom seat 53 when moving from the standby position to the punching position. After the sheet material 40 is cut, the punching head 51 moves away from the bottom seat 53 and returns to the standby position, and the sheet material 40 is restrained in the space between the guiding seat 52 and the bottom seat 53 by the guiding seat 52 to be prevented from being lifted with the return of the punching head 51 and getting stuck in the first conventional punching device.

As shown in FIG. 3, a second conventional punching device is disclosed in U.S. Pat. No. 7,201,101, and includes a bottom seat, a punching head, and a resilient member connected between the bottom seat and the punching head. The bottom seat has four upright guiding rods slidably engaging the punching head such that, the punching head can move along the guiding rods. Such configuration limits the second conventional punching device to be adapted to cut the corner 411 of a sheet material 41 away only, or to be adapted to form embossed patterns at the corner portions 411 of a sheet material only. When the second conventional punching device is attempted to cut holes 412 in a sheet material 41, since the sheet material 41 is not restrained between the bottom seat and a guiding seat as configured in the first conventional punching device, the sheet material 41 would be lifted by the return of the punching head which are used to cut the holes 412 and gets stuck in the second conventional punching device. In addition, the guiding rods form a blocking wall, such that the second conventional punching device is adapted to cut the corner portions 411 of the sheet material only.

SUMMARY

Therefore, the object of the disclosure is to provide a punching device that can be made of different materials, and that can cut holes in sheet materials.

According to the disclosure, the punching device is adapted to cut a sheet material, and includes a bottom seat module, an action module and a resilient mechanism. The bottom seat module includes a base plate having a plate body, a fitting hole unit that is formed in the plate body, and a first lower positioning structure that is formed on the plate body, and a restraint member disposed above the base plate, and having a plate portion that is spaced apart from the plate body of the base plate, and a through hole unit that extends through the plate portion. The plate portion has a bottom surface facing toward the plate body of the base plate, and disposed for restraining the sheet material. The plate portion and the base plate are made of different materials. The action module is disposed above the bottom seat module, is movable in a top-bottom direction relative to the bottom seat module between a standby position and a punching position, and includes a punching head having a main body that is disposed above the plate portion of the restraint member, a punching unit that extends downwardly from the main body and that corresponds in shape to the fitting hole unit, and a first upper positioning structure that is formed on the main body. When the action module is at the standby position, one of the first upper positioning structure and the first lower positioning structure extends through the through hole unit and to slidably engage the other one of the first upper positioning structure and the first lower positioning structure such that the action module is prevented from moving relative to the bottom seat module in a direction which is perpendicular to the top-bottom direction, and that the punching unit is aligned with the fitting hole unit in the top-bottom direction. The resilient mechanism is disposed between the bottom seat module and the action module for offering a resilient force to move the action module from the punching position to the standby position.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
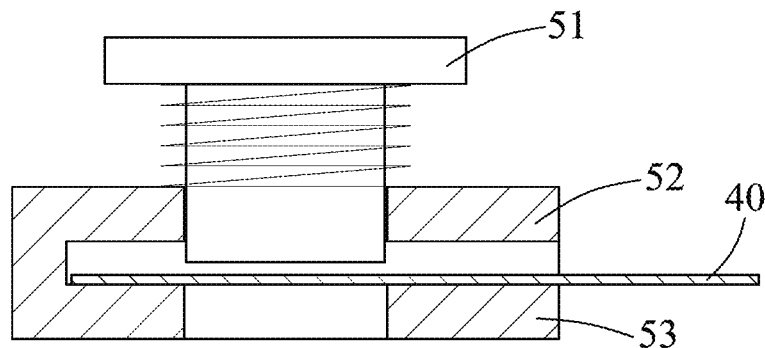
FIG. 1 is a schematic partly sectional view illustrating a punching head of a first conventional punching device at a standby position.
Figure 2:
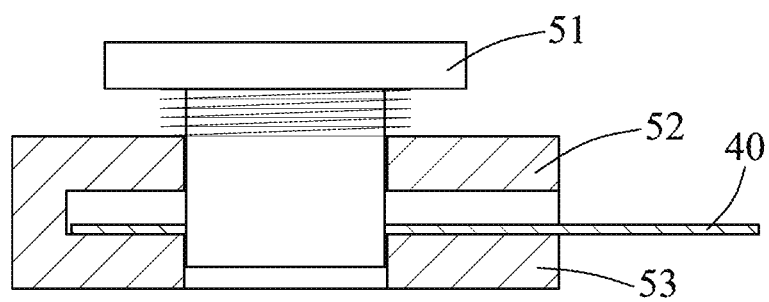
FIG. 2 is another schematic partly sectional view illustrating the punching head at a punching position.
Figure 3:
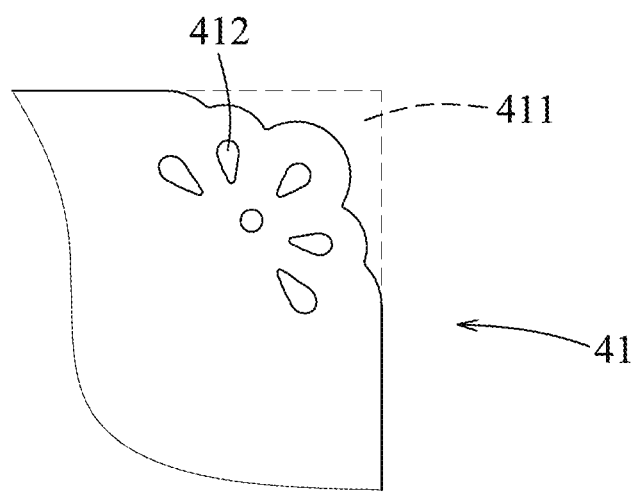
FIG. 3 is a schematic top view illustrating a sheet material is cut by a punching head of a second conventional punching device.
Figure 4:
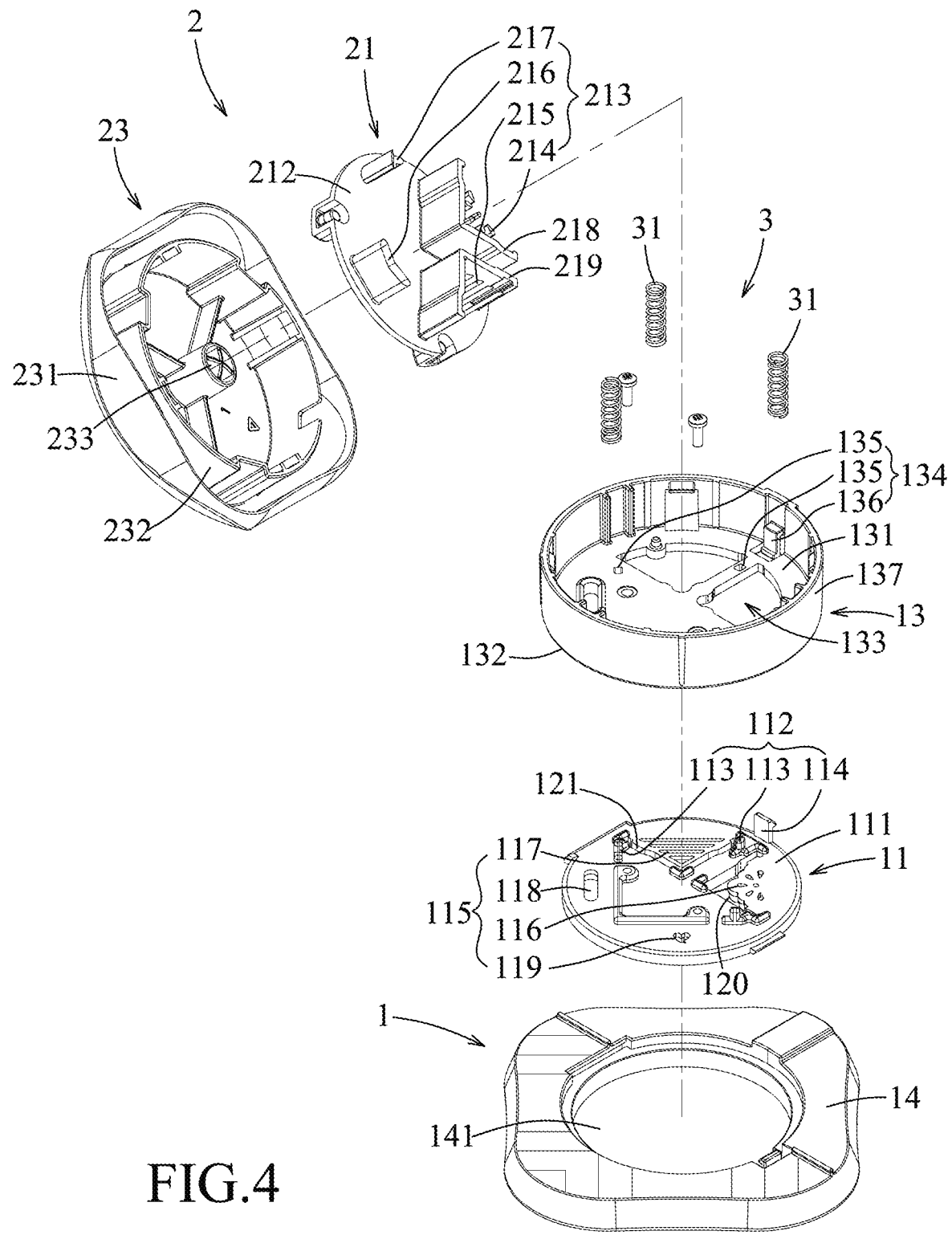
FIG. 4 is a perspective exploded view illustrating a first embodiment of a punching device according to the disclosure.
Figure 5:
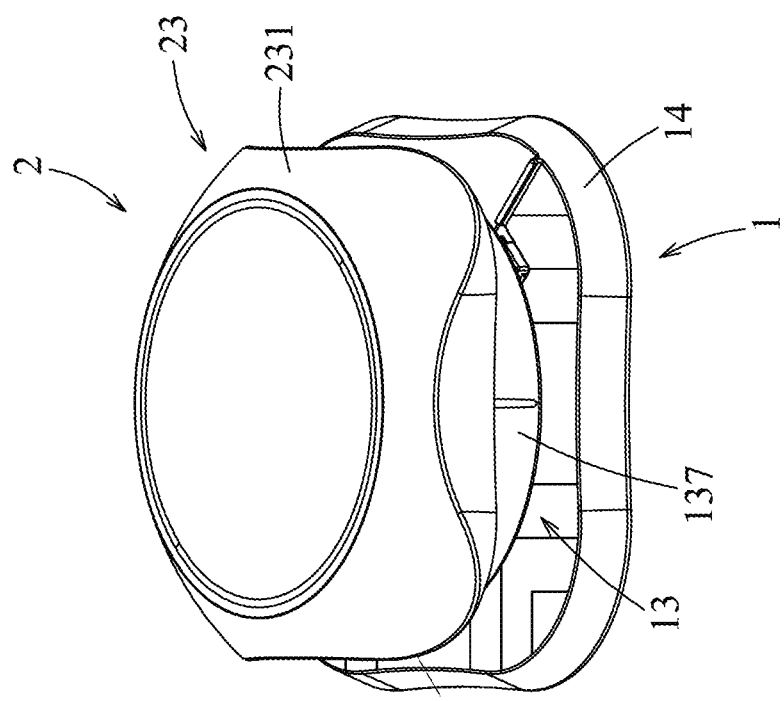
FIG. 5 is a schematic perspective view illustrating the first embodiment and a sheet material.
Figure 5:
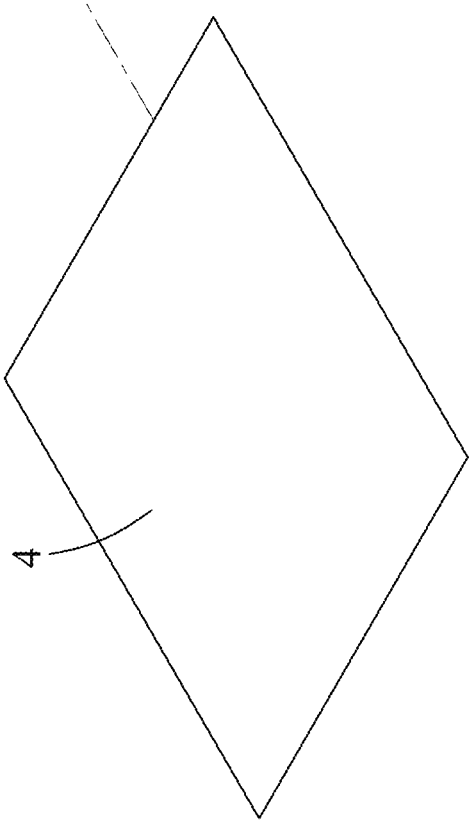
Figure 6:
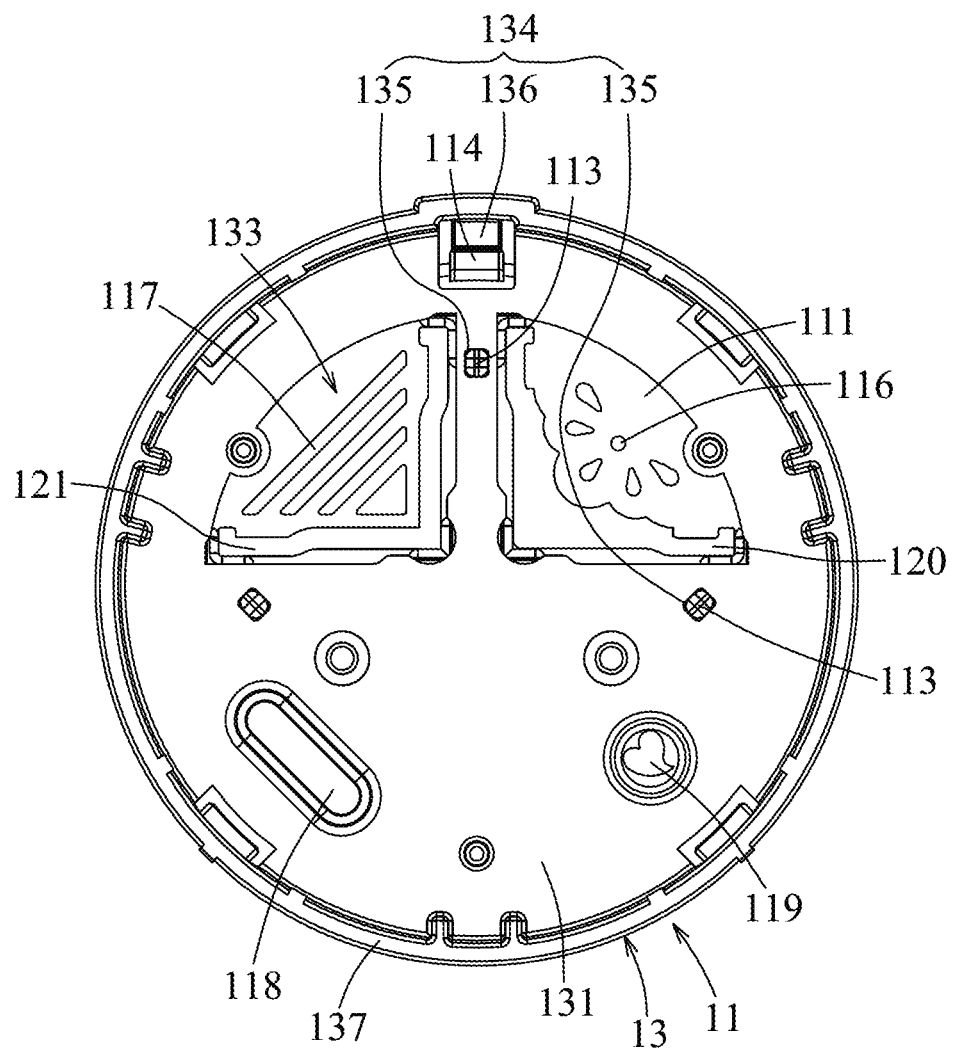
FIG. 6 is an assembled top view illustrating a base plate and a restraint member of the first embodiment.
Figure 7:
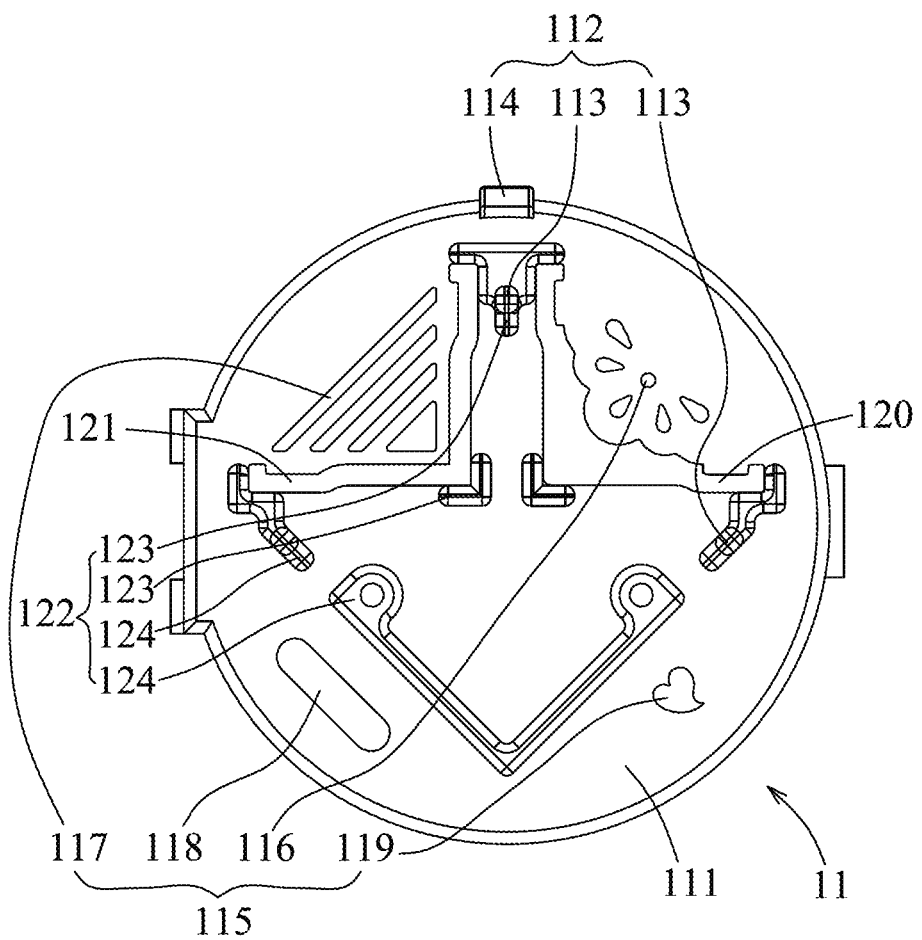
FIG. 7 is a top view illustrating the base plate of the first embodiment.
Figure 8:
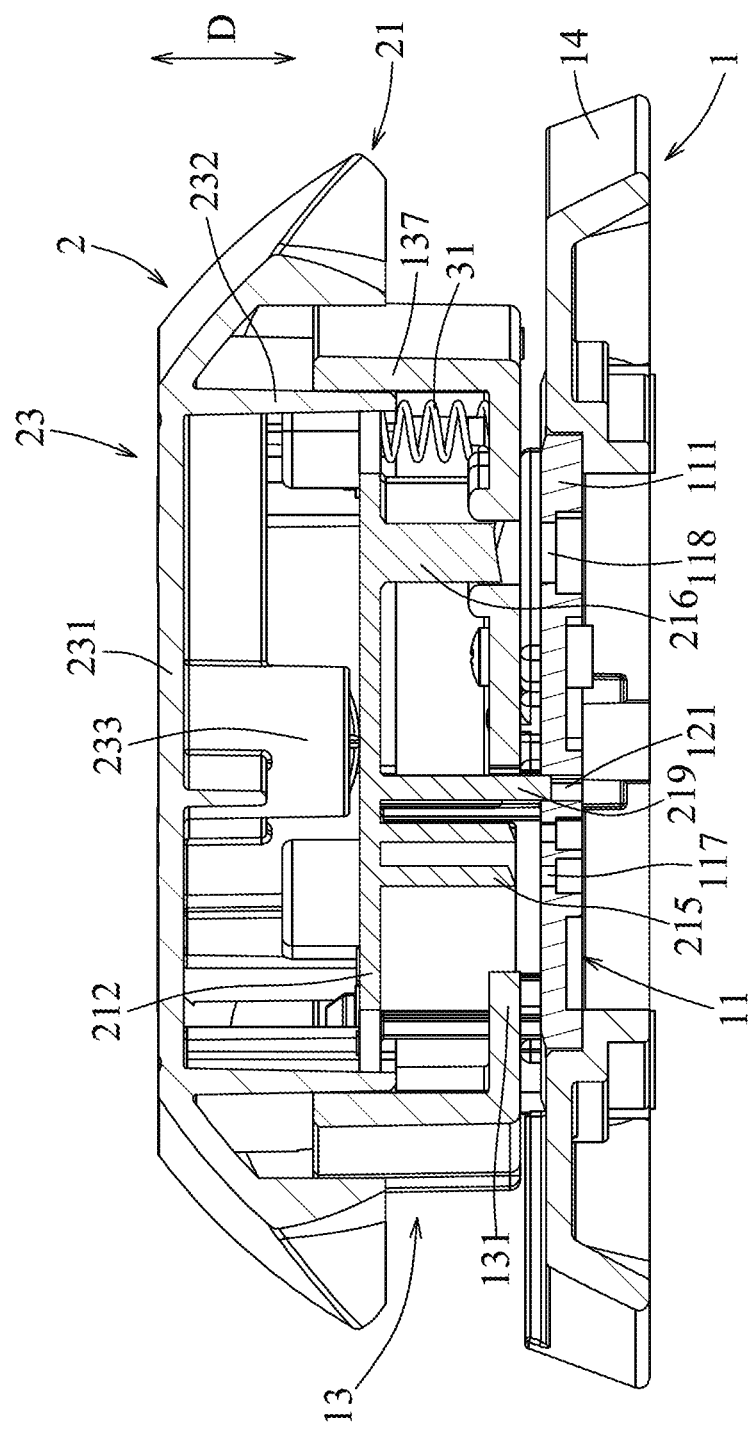
FIG. 8 is a schematic sectional view illustrating an action module of the first embodiment at a standby position.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 4 to 7, the first embodiment of a punching device is adapted to cut a sheet material 4. The sheet material 4 may be a sheet of paper, a wood sheet, a seaweed sheet or the like. The punching device includes a bottom seat module 1, an action module 2 disposed above the bottom seat module 1, and a resilient mechanism 3 disposed between the bottom seat module 1 and the action module 2.

The bottom seat module 1 includes a base plate 11, a restraint member 13 and a supporting seat 14. The base plate 11 has a plate body 111, a fitting hole unit 115 formed in the plate body 111, and first and second lower positioning structures 120, 121 formed on the plate body 111. In this embodiment, the fitting hole unit 115, the first lower positioning structure 120 and the second lower positioning structure 121 are configured as through holes that extend through the plate body 111, and may be varied in other embodiments. The fitting hole unit 115 includes a first fitting hole portion 116, a second fitting hole portion 117, a third fitting hole portion 118 and a fourth fitting hole portion 119. The restraint member 13 is disposed above the base plate 11, and has a plate portion 131 spaced apart from the plate body 111 of the base plate 11, a through hole unit 133, and a surrounding wall 137 extending upwardly from a periphery of the plate portion 131. The plate portion 131 and the base plate 11 are made of different materials. In this embodiment, the plate portion 131 and the surrounding wall 137 are formed as one piece, and may be varied in other embodiments. The plate portion 131 has a bottom surface 132 facing toward the plate body 111 of the base plate 11, and disposed for restraining the sheet material 4. The through hole unit 133 extends through the plate portion 131. The base plate 11 further has a lower fixing unit 112 including a plurality of protrusions 113 that extend from the plate body 111 toward the restraint member 13, and an engaging portion 114. The restraint member 13 further has an upper fixing unit 134 fixedly connected to the lower fixing unit 112, and including a plurality of through holes 135 that extend through the plate portion 131, and that respectively permit the protrusions 113 of the lower fixing unit 112 to be inserted thereinto, and an engaged portion 136 that is engaged with the engaging portion 114 of the lower fixing unit 112.

By virtue of the upper fixing unit 134 and the lower fixing unit 112, the restraint member 13 is positioned relative to the base plate 11. In this embodiment, two screws are disposed to lock the plate portion 131 of the restraint member 13 to the plate body 111 of the base plate 11, and the way to lock the restraint member 13 to the base plate 11 may be varied in other embodiments. The base plate 11 further has a spacing unit 122 including a plurality of protruding blocks 123 that extend from the plate body 111 toward the restraint member 13, and a plurality of abutted blocks 124 that extend from the plate body 111 toward the restraint member 13, and that are disposed for restraining the sheet material 4. The protruding blocks 123 and the abutted blocks 124 abut against the plate portion 131 of the restraint member 13 such that a space that permits insertion of the sheet material 4 is defined between the plate portion 131 of the restraint member 13 and the plate body 111 of the base plate 11. The supporting seat 14 supports the base plate 11, and has a hollow central portion defining a retaining space 141 that receives the base plate 11.

Figure 9:
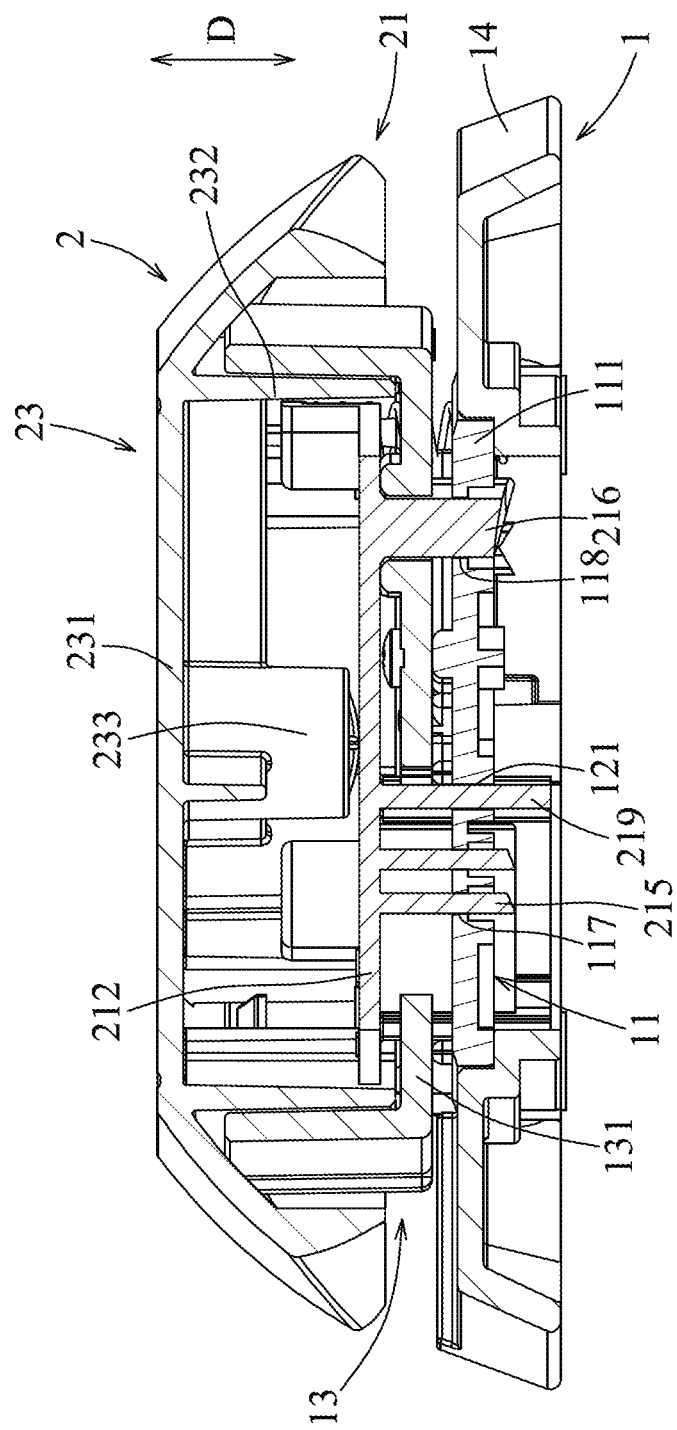
FIG. 9 is another schematic sectional view illustrating the action module at a punching position.
Figure 10:
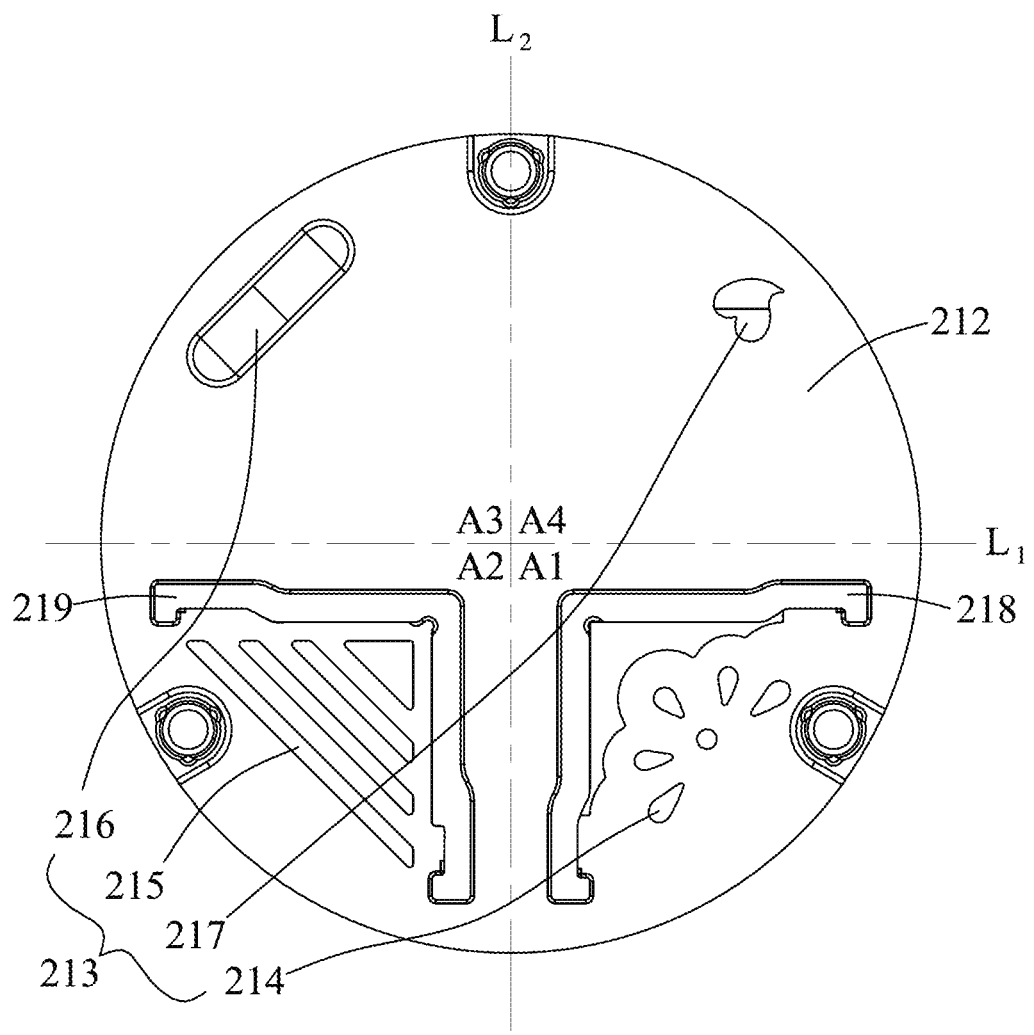
FIG. 10 is a bottom view illustrating a punching head of the first embodiment.

Referring to FIGS. 4, and 7 to 9, the action module 2 is movable in a top-bottom direction (D) relative to the bottom seat module 1 between a standby position (see FIG. 8) and a punching position (see FIG. 9). The action module 2 includes a punching head 21 and an upper cover 23. The punching head 21 has a main body 212 disposed above the plate portion 131 of the restraint member 13, a punching unit 213 extending downwardly from the main body 212, and corresponding in shape to the fitting hole unit 115, and first and second upper positioning structures 218, 219 formed on the main body 212. In this embodiment, each of the first and second upper positioning structures 218, 219 is configured as a projection, extends downwardly from the main body 212, and has an L-shaped cross-section. Each of the first and second lower positioning structures 120, 121 is configured as an L-shaped through groove, extends through the plate body 111, and is disposed for slidable engagement with a respective one of the first and second upper positioning structures 218, 219. When the action module 2 is at the standby position, the punching unit 213 is spaced apart from the fitting hole unit 115, the first upper positioning structure 218 extends through the through hole unit 133 to slidably engage the first lower positioning structure 120 in such a manner that the first upper positioning structure 218 and the first lower positioning structure 120 are only permitted to move relative to each other in the top-bottom direction (D), and the second upper positioning structure 219 extends through the through hole unit 133 to slidably engage the second lower positioning structure 121 in such a manner that the second upper positioning structure 219 and the second lower positioning structure 121 are only permitted to move relative to each other in the top-bottom direction (D), such that the action module 2 is prevented from moving relative to the bottom seat module 1 in a direction perpendicular to the top-bottom direction (D), and that the punching unit 213 is aligned with the fitting hole unit 115 in the top-bottom direction (D) so as to be smoothly inserted into the fitting hole unit 115 via the through hole unit 133 when the action module 2 is at the punching position. In another embodiment, each of the first and second upper positioning structures 218, 219 may be configured as a through groove that is formed in the main body 212, and each of the first and second lower positioning structures 120, 121 may be configured as a projection that extends from the plate body 111 and through the through hole unit 133 to slidably engage a corresponding one of the first and second upper positioning structures 218, 219, and the shape of each of the first and second upper positioning structures 218, 219 and the first and second lower positioning structures 120, 121 may be varied. In still another embodiment, the number of each of the upper and lower positioning structures may be one or more than two.

Since the punching unit 213 is aligned with the fitting hole unit 115 in the top-bottom direction (D) by virtue of the first and second upper positioning structures 218, 219 and the first and second lower positioning structures 120, 121, the through hole unit 133 of the restraint member 13 is not required to be precisely shaped to correspond to the punching unit 213 in the top-bottom direction (D), and a certain inaccuracy is permitted when manufacturing the through hole unit 133 as long as the through hole unit 133 of the restraint member 13 permits the first and second upper positioning structures 218, 219 and the punching unit 213 to extend there through. Therefore, the restraint member 13 is not required to be formed as one piece with the base plate 11, and is not required to be made of a material that is the same as that of the base plate 11.

The upper cover 23 is movably disposed on the restraint member 13, abuts against the main body 212 of the punching head 21, and has an outer cover body 231, an inner wall 232 extending downwardly from the outer cover body 231, and surrounded by the surrounding wall 137 of the restraint member 13, and a supporting part 233 extending downwardly from a center portion of the outer cover body 231 to abut against the main body 212 of the punching head 21.

The resilient mechanism 3 is disposed for offering a resilient force to move the action module 2 from the punching position to the standby position, and includes three resilient members 31 each having two ends that are respectively connected to the main body 212 of the action module 2 and the plate portion 131 of the restraint member 13.

Referring to FIGS. 10 to 14, in this embodiment, the punching unit 213 of the punching head 21 includes a first punching portion 214, a second punching portion 215, a third punching portion 216 and a fourth punching portion 217 that can cut different patterns on the sheet material 4. The first fitting hole portion 116, the second fitting hole portion 117, the third fitting hole portion 118 and the fourth fitting hole portion 119 respectively correspond in shape to the first punching portion 214, the second punching portion 215, the third punching portion 216 and the fourth punching portion 217. The main body 212 of the punching head 21 has a bottom surface divided into a first punching section (A1), a second punching section (A2), a third punching section (A3) and a fourth punching section (A4) by first and second imaginary lines (L1, L2) that belong to the bottom surface, that intersect at a center of the bottom surface, and that are perpendicular to each other. The first punching portion 214 is located in the first punching section (A1), the second punching portion 215 is located in the second punching section (A2), the third punching portion 216 is located in the third punching section (A3), and the fourth punching portion 217 is located in the fourth punching section (A4). The first upper positioning structure 218 is connected to the first punching portion 214, and is located in the first punching section (A1). The L-shaped first upper positioning structure 218 has two prongs cooperatively defining an opening that opens away from the center of the bottom surface of the main body 212. A distance between the first upper positioning structure 218 and the center of the bottom surface of the main body 212 is smaller than that between the first punching portion 214 and the center of the bottom surface of the main body 212, so that a corner portion of the sheet material 4 can abut against the first upper positioning structure 218 to be positioned in the first punching section (A1) (see FIG. 11). The second upper positioning structure 219 is located in the second punching section (A2), and is proximate to the second punching portion 215. The L-shaped second upper positioning structure 219 has two prongs cooperatively defining an opening that opens away from the center of the bottom surface of the main body 212. A distance between the second upper positioning structure 219 and the center of the bottom surface of the main body 212 is smaller than that between the second punching portion 215 and the center of the bottom surface of the main body 212, so that a corner portion of the sheet material 4 can abut against the second upper positioning structure 219 to be positioned in the second punching section (A2) (see FIG. 12). Similarly, an edge of the sheet material 4 can abut against the abutted blocks 124 such that the sheet material 4 is positioned in the third punching section (A3) (see FIG. 13), and an edge of the sheet material 4 can abut against the abutted blocks 124 such that the sheet material 4 is positioned in the fourth punching section (A4) (see FIG. 14).

Figure 11:
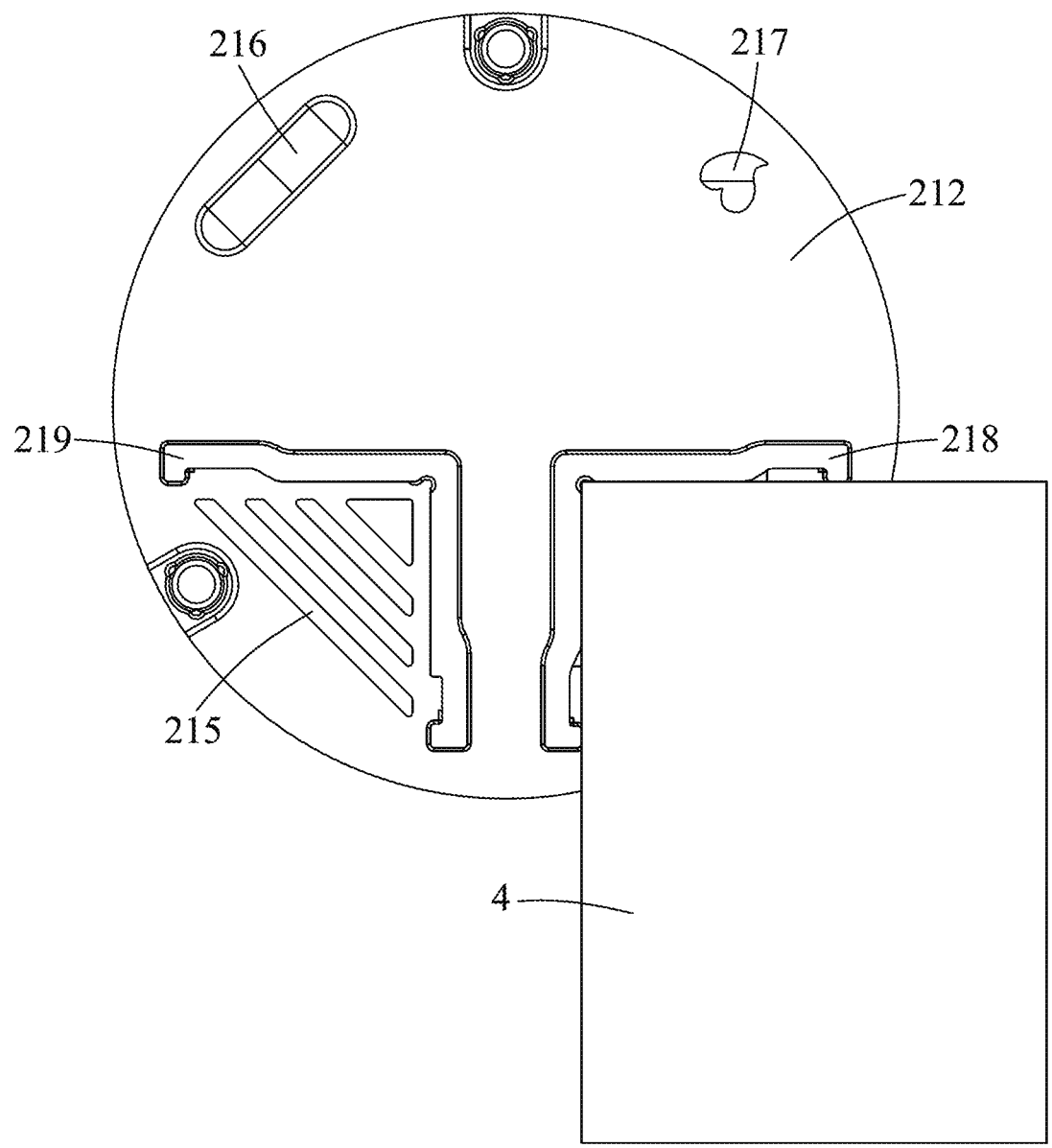
FIG. 11 is a schematic bottom view illustrating the sheet material being disposed at a first punching section of the punching head.
Figure 12:
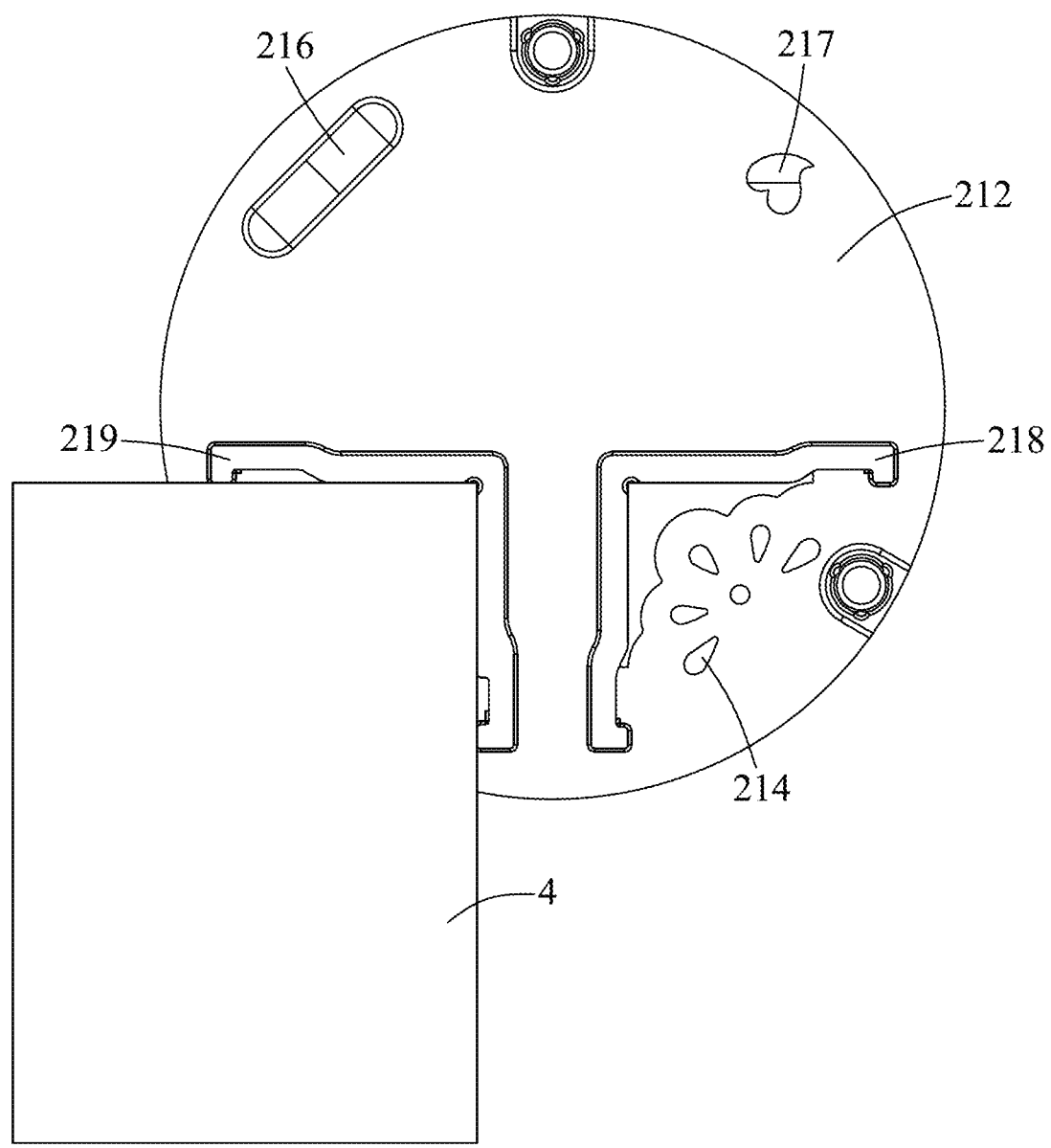
FIG. 12 is another schematic bottom view illustrating the sheet material being disposed at a second punching section of the punching head.
Figure 13:
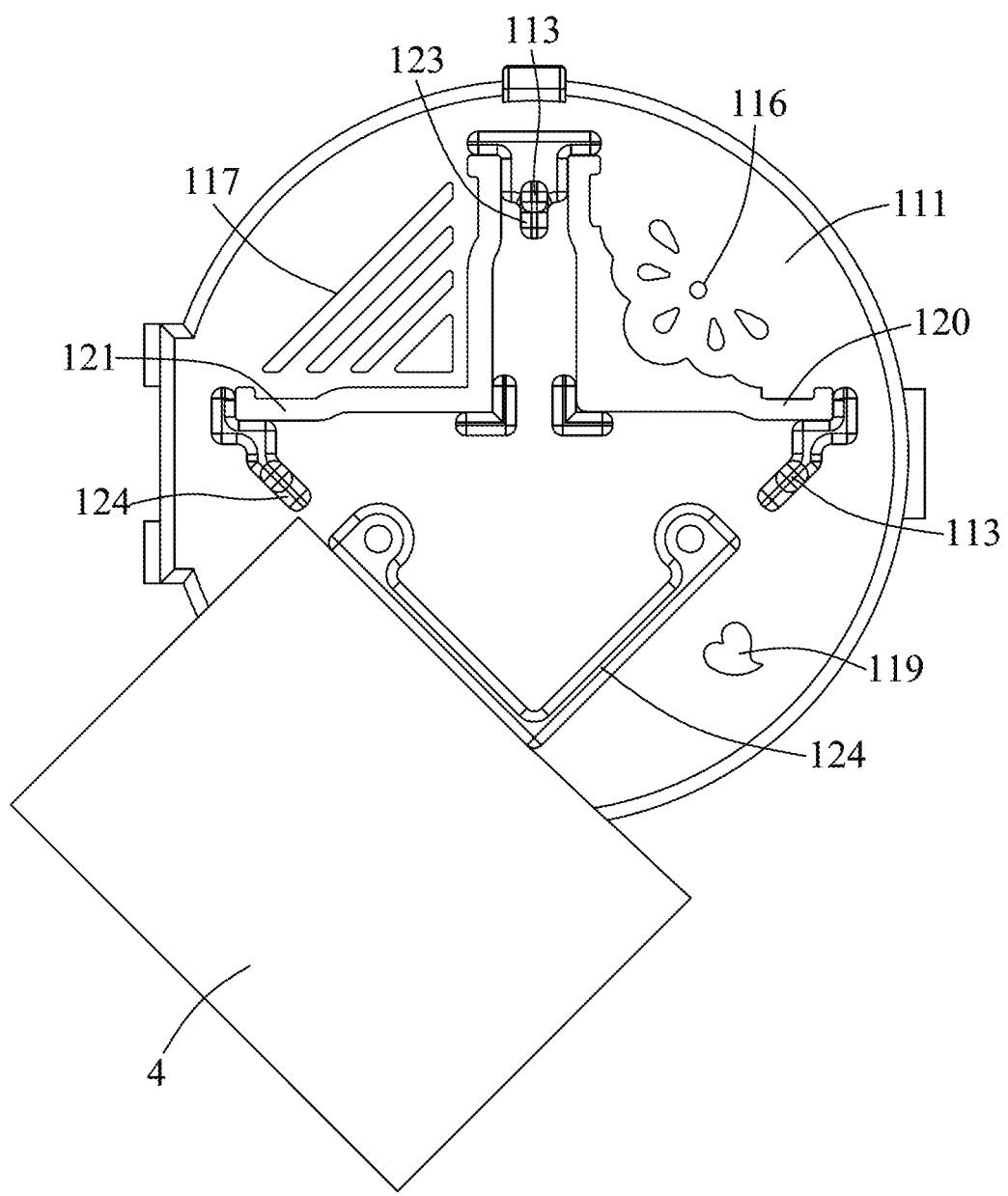
FIG. 13 is a schematic top view illustrating the sheet material abutting against an abutted block of the base plate.
Figure 14:
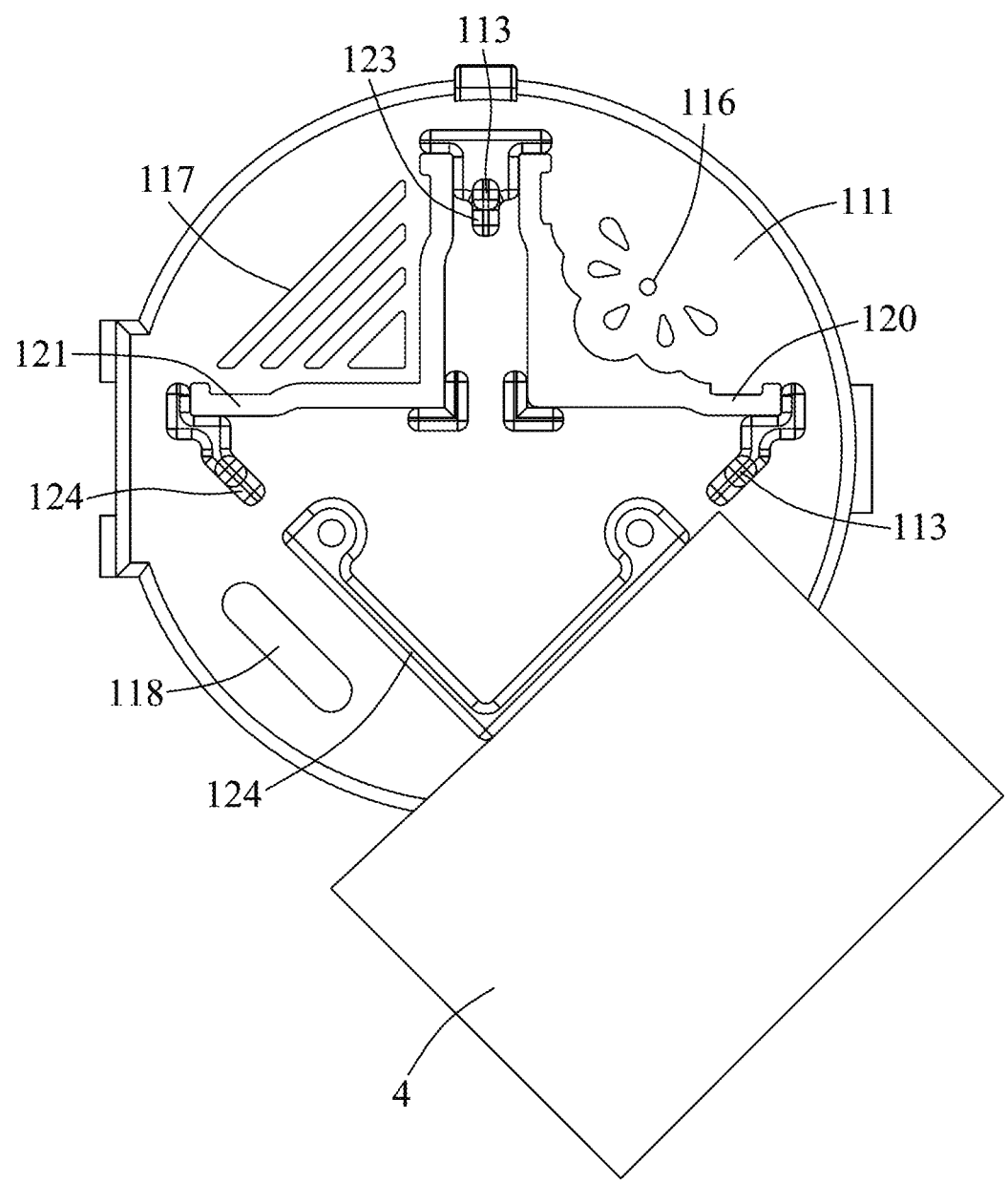
FIG. 14 is another schematic view illustrating the sheet material abutting against the abutted block of the base plate.
Figure 15:
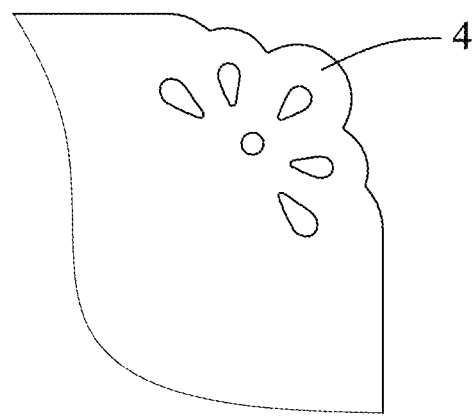
FIG. 15 is a fragmentary top view illustrating the sheet material cut by the first punching section of the punching head of the first embodiment.
Figure 16:
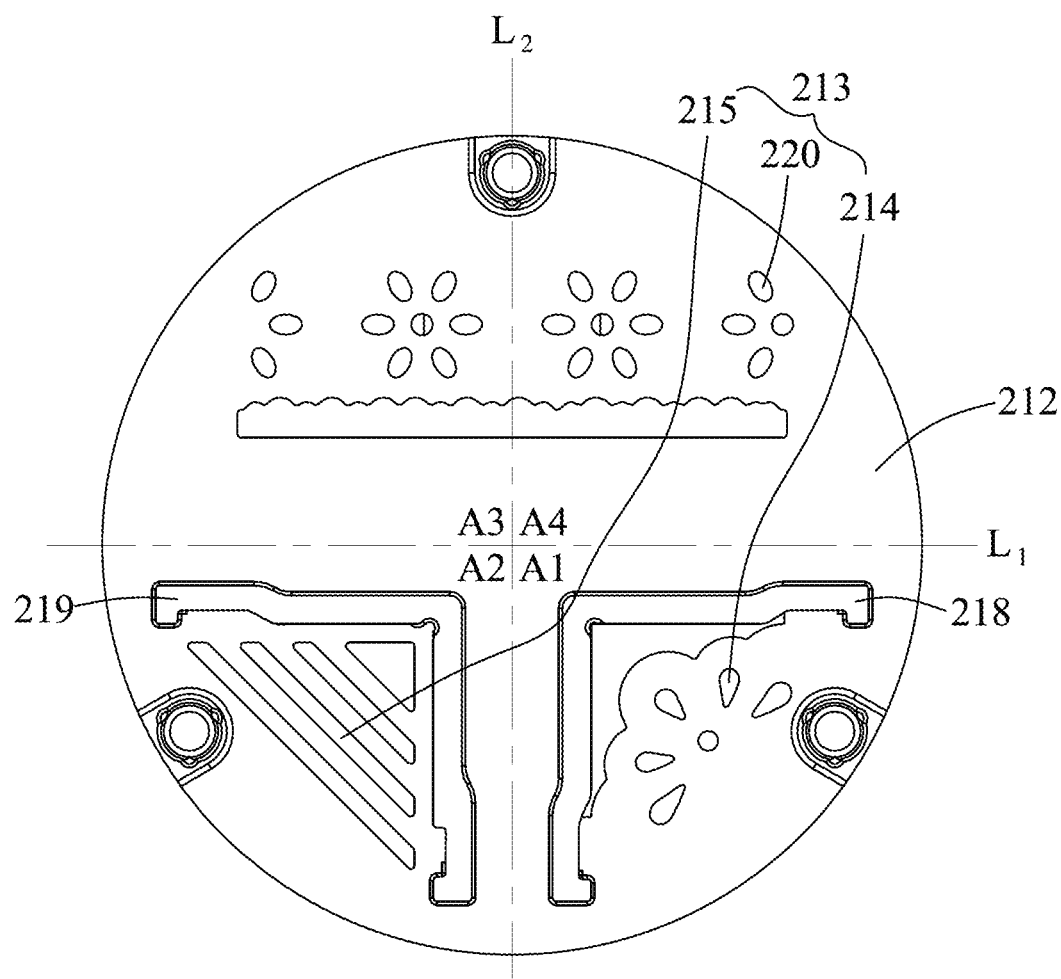
FIG. 16 is a bottom view illustrating a punching head of a second embodiment of the punching device according to the disclosure.
Figure 17:
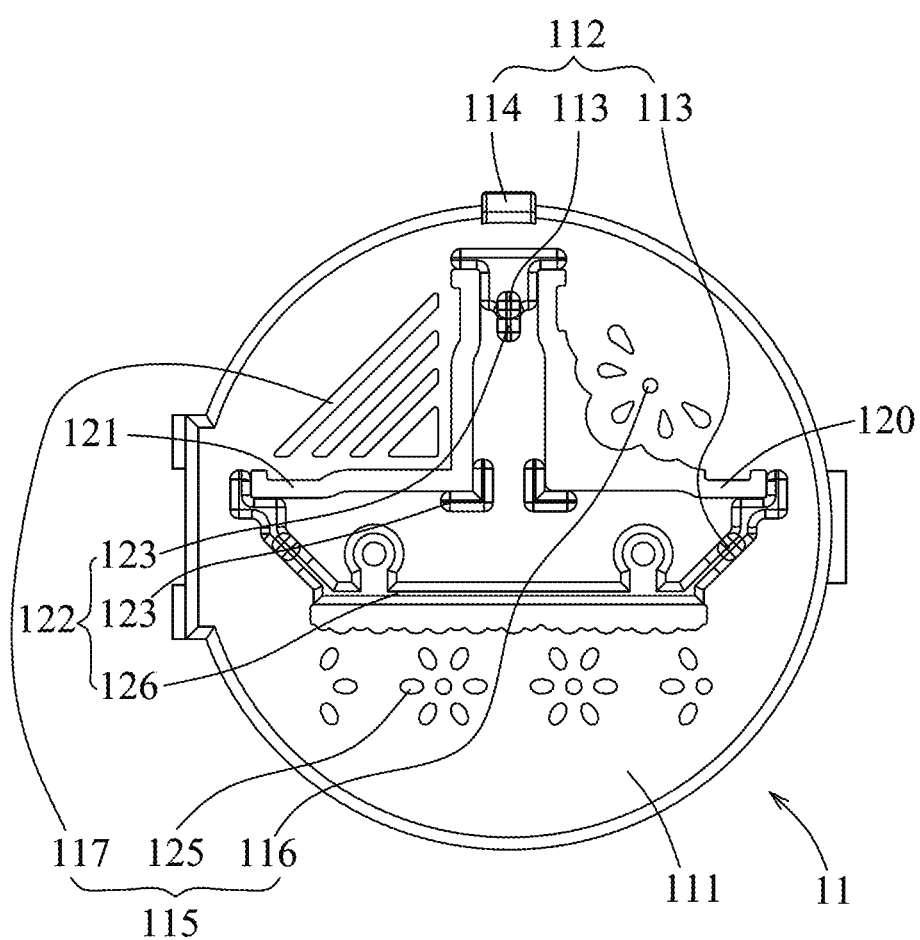
FIG. 17 is a top view illustrating a base plate of the second embodiment.
Figure 18:
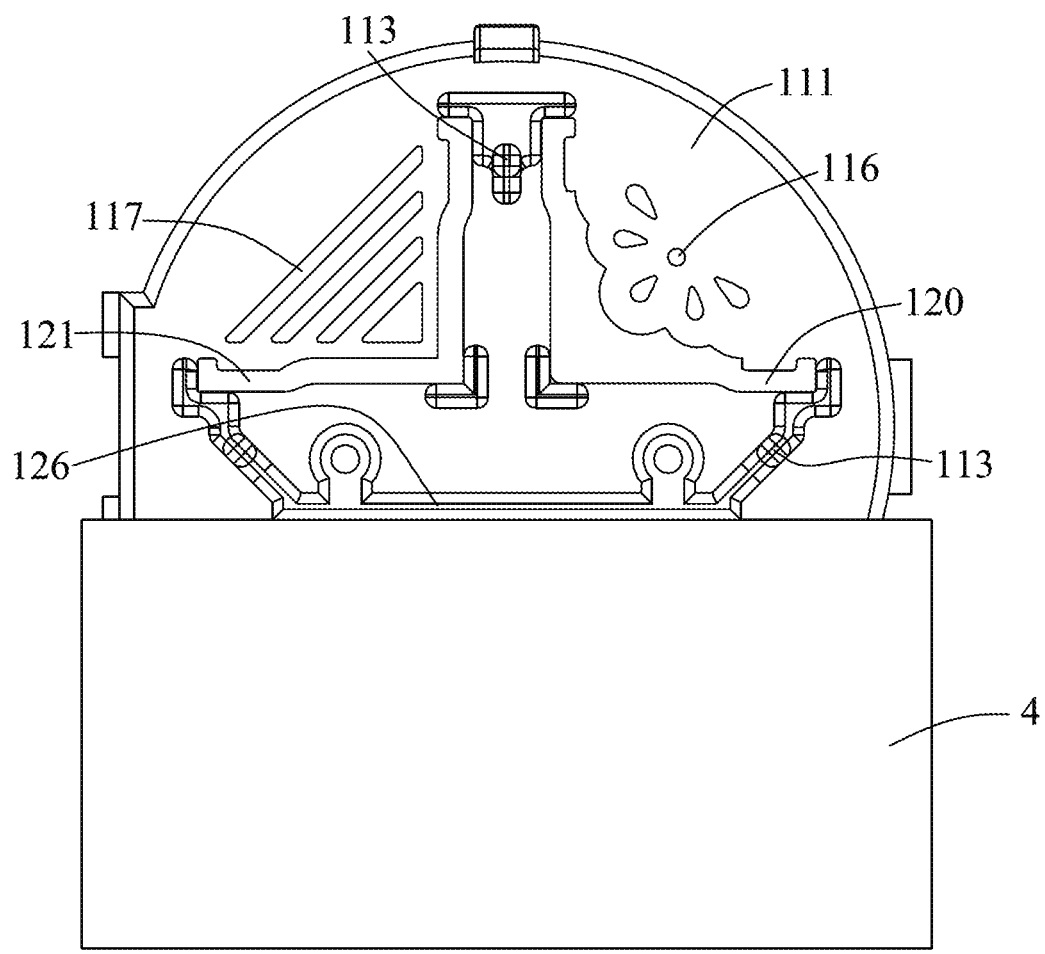
FIG. 18 is a schematic top view illustrating the sheet material abutting against an abutted block of the base plate.

Referring to FIGS. 4, 8 to 10, and 15, during operation, a portion of the sheet material 4 which is desired to be cut is first inserted into the space between the base plate 11 and the restraint member 13 so as to be positioned in a desired punching section when the action module 2 is at the standby position (for example, as shown in FIG. 11, when the sheet material 4 is disposed in the first punching section (A1), the portion of the sheet material 4 abuts against the first upper positioning structure 218). Subsequently, the upper cover 23 is depressed to move the action module 2 to the punching position, and the portion of the sheet material 4 is cut to form a desired pattern. As shown in FIG. 15, the desired pattern on the portion of the sheet material 4 is formed after the sheet material 4 is cut in the first punching section (A1). When the upper cover 23 is released, the action module 2 is moved back to the standby position by the resilient force generated by the resilient mechanism 3. When the action module 2 is moved away from the punching position to the standby position, the bottom surface 132 of the restraint member 13 serves to abut against the sheet material 4 and restrain the sheet material 4 in the space so as to force the sheet material 4 to be separated from the punching unit 213 as the sheet material 4 is lifted by the punching unit 213. As such, the sheet material 4 is prevented from being stuck in the punching device.

Figure 19:
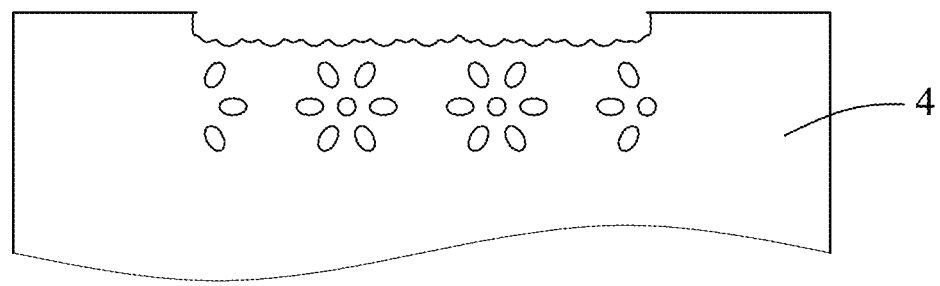
FIG. 19 is a fragmentary top view illustrating the sheet material cut by a third punching section of the punching head of the second embodiment.

Referring to FIGS. 16 to 19, the second embodiment has a structure similar to that of the first embodiment. The main difference between this embodiment and the previous embodiment resides in the configuration of the punching unit 213. In this embodiment, the punching unit 213 has a first punching portion 214, a second punching portion 215 and a third punching potion 220. The first and second punching portions 214, 215 are respectively located in the first and second punching sections (A1, A2), and the third punching portion 220 spans the third and fourth punching sections (A3, A4). Correspondingly, the fitting hole unit 115 has a first fitting hole portion 116, a second fitting hole portion 117 and a third fitting hole portion 125. The third fitting hole portion 125 corresponds in shape to the third punching portion 220. In this embodiment, the spacing unit 122 has a plurality of protruding blocks 123 and an abutted block 126. To cut the sheet material 4 with the third punching portion 220, the sheet material 4 is disposed to abut against the abutted block 126 of the spacing unit 122, and the sheet material 4 is cut to form a desired pattern, as shown in FIG. 19. It should be noted that, in the first and second embodiments, the sheet material 4 is positioned by the first upper positioning structure 218, the second upper positioning structure 219 and the spacing unit 122, and the punching area and the cut location may be varied in other embodiments by adjustment of the arrangement of the first upper positioning structure 218, the second upper positioning structure 219 and the spacing unit 122.

The following advantages can be concluded from the above-mentioned description:

1. Since the through hole unit 133 of the restraint member 13 is not required to be precisely shaped to correspond to the punching unit 213, the restraint member 13 and the base plate 11 are not required to be formed as one piece, and the restraint member 13 can be made of plastic which is relatively uncostly.

2. Since the restraint member 13 can be made of plastic, the weight of the punching device can be reduced.

3. After a punching operation, the sheet material 4 is restrained in the space between the base plate 11 and the restraint member 13 by the restraint member 13, so as to be forced to be separated from the punching head 21.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A punching device adapted to cut a sheet material, comprising:

a bottom seat module including a base plate that has a plate body, a fitting hole unit formed in said plate body, and a first lower positioning structure formed on said plate body, and a restraint member that is disposed above said base plate, and that has a plate portion spaced apart from said plate body of said base plate, and a through hole unit extending through said plate portion, said plate portion having a bottom surface that faces toward said plate body of said base plate, and that is disposed for restraining the sheet material, said plate portion and said base plate being made of different materials;

an action module disposed above said bottom seat module, movable in a top-bottom direction relative to said bottom seat module between a standby position and a punching position, and including a punching head that has a main body disposed above said plate portion of said restraint member, a punching unit extending downwardly from said main body, and corresponding in shape to said fitting hole unit, and a first upper positioning structure formed on said main body, when said action module is at the standby position, one of said first upper positioning structure and said first lower positioning structure extends through said through hole unit to slidably engage the other one of said first upper positioning structure and said first lower positioning structure such that said action module is prevented from moving relative to said bottom seat module in a direction which is perpendicular to the top-bottom direction, and that said punching unit is aligned with said fitting hole unit in the top-bottom direction; and a resilient mechanism disposed between said bottom seat module and said action module for offering a resilient force to move said action module from the punching position to the standby position, wherein:

said first upper positioning structure of said action module is configured as a projection extending downwardly from said main body, and said first lower positioning structure of said bottom seat module is configured as a through groove extending through said plate body, and disposed for engagement with said first upper positioning structure;

said first upper positioning structure of said action module has an L-shaped cross-section, and said first lower positioning structure of said bottom seat module is an L-shaped groove;

said punching head further has a second upper positioning structure extending downwardly from said main body, and having an L-shaped cross-section;

said base plate further has a second lower positioning structure extending through said plate body, and configured as an L-shaped groove, said second upper positioning structure extending through said through hole unit to slidably engage said second lower positioning structure;

said punching unit includes a first punching portion connected to said first upper positioning structure, and said fitting hole unit includes a first fitting hole portion corresponding in shape to said first punching portion;

said main body has a bottom surface divided into a first punching section, a second punching section, a third punching section and a fourth punching section by first and second imaginary lines that belong to said bottom surface, that intersect at a center of said bottom surface, and that are perpendicular to each other;

said first upper positioning structure and said first punching portion are located in said first punching section; and said L-shaped first upper positioning structure has two prongs cooperatively defining an opening that opens away from said center of said bottom surface of said main body, a distance between said first upper positioning structure and said center of said bottom surface of said main body being smaller than that between said first punching portion and said center of said bottom surface of said main body.

2. The punching device as claimed in claim 1, wherein:
said punching unit further includes a second punching portion, and said fitting hole unit further includes a second fitting hole portion corresponding in shape to said second punching portion;
said second upper positioning structure and said second punching portion are located in said second punching section;
said L-shaped second upper positioning structure has two prongs cooperatively defining an opening that opens away from said center of said bottom surface of said main body, a distance between said second upper positioning structure and said center of said bottom surface of said main body being smaller than that between said second punching portion and said center of said bottom surface of said main body;
said punching unit further includes a third punching portion located in said third punching section, and a fourth punching portion located in said fourth punching section; and
said fitting hole unit further includes a third fitting hole portion corresponding in shape to said third punching portion, and a fourth fitting hole portion corresponding in shape to said fourth punching portion.

3. The punching device as claimed in claim 1, wherein:
said punching unit further includes a second punching portion, and said fitting hole unit further includes a second fitting hole portion corresponding in shape to said second punching portion;
said second upper positioning structure and said second punching portion are located in said second punching section;
said L-shaped second upper positioning structure has two prongs cooperatively defining an opening that opens away from said center of said bottom surface of said main body, a distance between said second upper positioning structure and said center of said bottom surface of said main body being smaller than that between said second punching portion and said center of said bottom surface of said main body;
said punching unit further includes a third punching portion located in said third punching section and said fourth punching section; and
said fitting hole unit further includes a third fitting hole portion corresponding in shape to said third punching portion.

4. The punching device as claimed in claim 1 wherein said base plate further has a lower fixing unit, and said restraint member further has an upper fixing unit fixedly connected to said lower fixing unit.

5. The punching device as claimed in claim 1, wherein said restraint member further has a surrounding wall extending upwardly from a periphery of said plate portion.

6. The punching device as claimed in claim 5, wherein said plate portion and said surrounding wall of said restraint member are formed as one piece.

7. The punching device as claimed in claim 5, wherein:
said action module further includes an upper cover movably disposed on said restraint member, and abutting against said main body of said punching head; and
said bottom seat module further includes a supporting seat supporting said base plate.

8. A punching device adapted to cut a sheet material, comprising:

a bottom seat module including:
a base plate that has a plate body, a fitting hole unit formed in said plate body, and a first lower positioning structure formed on said plate body, and
a restraint member that is disposed above said base plate, and that has a plate portion spaced apart from said plate body of said base plate, and a through hole unit extending through said plate portion, said plate portion having a bottom surface that faces toward said plate body of said base plate, and that is disposed for restraining the sheet material, said plate portion and said base plate being made of different materials;
an action module disposed above said bottom seat module, movable in a top-bottom direction relative to said bottom seat module between a standby position and a punching position, and including
a punching head that has a main body disposed above said plate portion of said restraint member, a punching unit extending downwardly from said main body, and corresponding in shape to said fitting hole unit, and a first upper positioning structure formed on said main body, when said action module is at the standby position, one of said first upper positioning structure and said first lower positioning structure extends through said through hole unit to slidably engage the other one of said first upper positioning structure and said first lower positioning structure such that said action module is prevented from moving relative to said bottom seat module in a direction which is perpendicular to the top-bottom direction, and that said punching unit is aligned with said fitting hole unit in the top-bottom direction; and
a resilient mechanism disposed between said bottom seat module and said action module for offering a resilient force to move said action module from the punching position to the standby position,
wherein:
said first upper positioning structure of said action module is configured as a projection extending downwardly from said main body, and said first lower positioning structure of said bottom seat module is configured as a through groove extending through said plate body, and disposed for engagement with said first upper positioning structure;
said first upper positioning structure of said action module has an L-shaped cross-section, and said first lower positioning structure of said bottom seat module is an L-shaped groove;
said punching unit includes a first punching portion connected to said first upper positioning structure, and said fitting hole unit includes a first fitting hole portion corresponding in shape to said first punching portion;
said main body has a bottom surface divided into a first punching section, a second punching section, a third punching section and a fourth punching section by first and second imaginary lines that belong to said bottom surface, that intersect at a center of said bottom surface, and that are perpendicular to each other;
said first upper positioning structure and said first punching portion are located in said first punching section; and
said L-shaped first upper positioning structure has two prongs cooperatively defining an opening that opens away from said center of said bottom surface of said main body, a distance between said first upper positioning structure and said center of said bottom surface of said main body being smaller than that between said first punching portion and said center of said bottom surface of said main body.

9. The punching device as claimed in claim 8, wherein said base plate further has a lower fixing unit, and said restraint member further has an upper fixing unit fixedly connected to said lower fixing unit.

10. The punching device as claimed in claim 8, wherein said restraint member further has a surrounding wall extending upwardly from a periphery of said plate portion.

11. The punching device as claimed in claim 10, wherein said plate portion and said surrounding wall of said restraint member are formed as one piece.

12. The punching device as claimed in claim 10, wherein:
    said action module further includes an upper cover movably disposed on said restraint member, and abutting against said main body of said punching head; and
    said bottom seat module further includes a supporting seat supporting said base plate.

* * * * *